United States Patent
Bay et al.

(10) Patent No.: US 6,525,505 B2
(45) Date of Patent: Feb. 25, 2003

(54) DEVICE FOR DRIVING AN AIR-CONDITIONING COMPRESSOR

(75) Inventors: Wolfgang Bay, Frankfurt am Main (DE); Michael Henninger, Kelkheim (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/864,076

(22) Filed: May 22, 2001

(65) Prior Publication Data

US 2002/0008493 A1 Jan. 24, 2002

(30) Foreign Application Priority Data

Jun. 2, 2000 (DE) .......................... 100 27 617

(51) Int. Cl.7 ................................ H02P 1/26
(52) U.S. Cl. ...................... 318/778; 318/439
(58) Field of Search .................... 318/138, 254, 318/439, 778, 771, 773; 417/26, 44.2, 45

(56) References Cited

U.S. PATENT DOCUMENTS 3,913,342 A * 10/1975 Barry .......................... 318/473
6,014,004 A * 1/2000 Hamaoka et al. ............ 318/778
6,135,720 A * 10/2000 Boller ......................... 417/45
6,254,353 B1 * 7/2001 Polo et al. ................... 318/280

FOREIGN PATENT DOCUMENTS

| DE | 3601817 | 7/1987 |
|----|---------|--------|
| DE | 3739980 | 5/1988 |
| DE | 3915349 | 11/1989 |
| DE | 4212680 | 10/1992 |
| DE | 4212162 | 10/1993 |
| DE | 4430468 | 2/1996 |
| DE | 19706663 | 8/1998 |
| DE | 19713197 | 10/1998 |
| DE | 19726943 | 1/1999 |
| DE | 19908043 | 9/2000 |
| DE | 19925744 | 12/2000 |
| EP | 0085246 | 8/1983 |

* cited by examiner

Primary Examiner—Khanh Dang
(74) Attorney, Agent, or Firm—Martin A. Farber

(57) ABSTRACT

A device for driving an air-conditioning compressor having an electric motor, in particular for motor vehicles, having an arrangement for reducing the difference in pressure between the intake side and delivery side of the air-conditioning compressor during a starting phase of the electric motor.

13 Claims, 3 Drawing Sheets

DEVICE FOR DRIVING AN AIR-CONDITIONING COMPRESSOR

FIELD AND BACKGROUND OF THE INVENTION

The invention relates to a device for driving an air-conditioning compressor having an electric motor, in particular for motor vehicles.

Various requirements, in particular reliability, low costs, low maintenance need and the lowest weight possible, have to satisfied when driving air-conditioning compressors having electric motors. Furthermore, with the effect of saving on energy, the air-conditioning compressor should only be switched on when it is being used. However, when started repeatedly, the air-conditioning compressor operates counter to the pressure of the refrigerant, with the result that starting of the electric motor is made more difficult and, in particular, a high starting current arises.

Starting is more difficult particularly in sensorless activation methods where the rotor position is obtained from the electromotive force which, because of lack of speed, is virtually impossible to measure.

SUMMARY OF THE INVENTION

The object of the present invention is to specify a drive for air-conditioning compressors with the abovementioned disadvantages being avoided. According to the invention, this object is achieved in that an arrangement is provided for reducing the difference in pressure between the intake side and delivery side of the air-conditioning compressor during a starting phase of the electric motor.

The invention has the advantage that the starting current is substantially reduced and the electric motor does not therefore have to be configured to deal with the correspondingly high load. When spiral compressors are used, the cooling capacity is then more rapidly available because of the more rapid starting, since said spiral compressors seal better at higher speeds. In addition, the power lost in an electronic control device turns out to be less on account of the lower starting current.

Particularly if the refrigerant is also used for cooling the control device, the cooling of the control device is more rapidly available, which likewise permits use of cost-effective transistors. Finally, there is a lower load on the vehicle electric system during starting.

Demagnetization may also be prevented without an electronic control device, for example in the case of a DC motor containing brushes.

In a first advantageous refinement of the invention, provision is made for the arrangement for reducing the difference in pressure to be formed by an expansion valve which is arranged in the refrigerant circuit being controllable.

A second advantageous embodiment consists in that the arrangement for reducing the difference in pressure is formed by a controllable bypass between the intake side and delivery side of the air-conditioning compressor. In this case, the bypass can be arranged within or outside the housing of the air-conditioning compressor and can be controlled either electrically or mechanically.

A third advantageous embodiment makes provision for the arrangement for reducing the difference in pressure to be formed by a controllable, additional expansion valve which is arranged in the refrigerant circuit between the high-pressure side of the expansion valve and the intake side of the air-conditioning compressor.

A fourth advantageous embodiment consists in that the arrangement for reducing the difference in pressure is formed by a speed-controlled valve which is arranged in the air-conditioning compressor. In this case, provision may preferably be made for the speed-controlled valve to be a centrifugal seal.

The lower load during starting makes possible a development which consists in that the electric motor is a sensorless motor having electronic commutation. The technical outlay is reduced thereby, on the one hand, while the reliability is increased, on the other hand.

A further advantageous refinement of the invention consists in that a control unit activates the arrangement for reducing the difference in pressure within a predetermined period of time after the electric motor is switched on, and afterwards switches it off again.

In another advantageous refinement, provision is made for the controlling means of the arrangement for reducing the difference in pressure to be controllable as a function of the speed of the compressor.

Since the reduction in the difference in pressure leads to cooling of the intake side, it is additionally advantageous if the control unit and the electric motor are in heat-conducting connection with the refrigerant on the intake side.

BRIEF DESCRIPTION OF THE DRAWING

The invention permits numerous embodiments. One of these is illustrated schematically in the drawing with reference to a number of figures and is described below. In the drawing.

Identical parts are provided with the same reference symbols in the figures.

DETAILED DESCRIPTION OF THE PREFERRED EMBODIMENT

Figure 1:
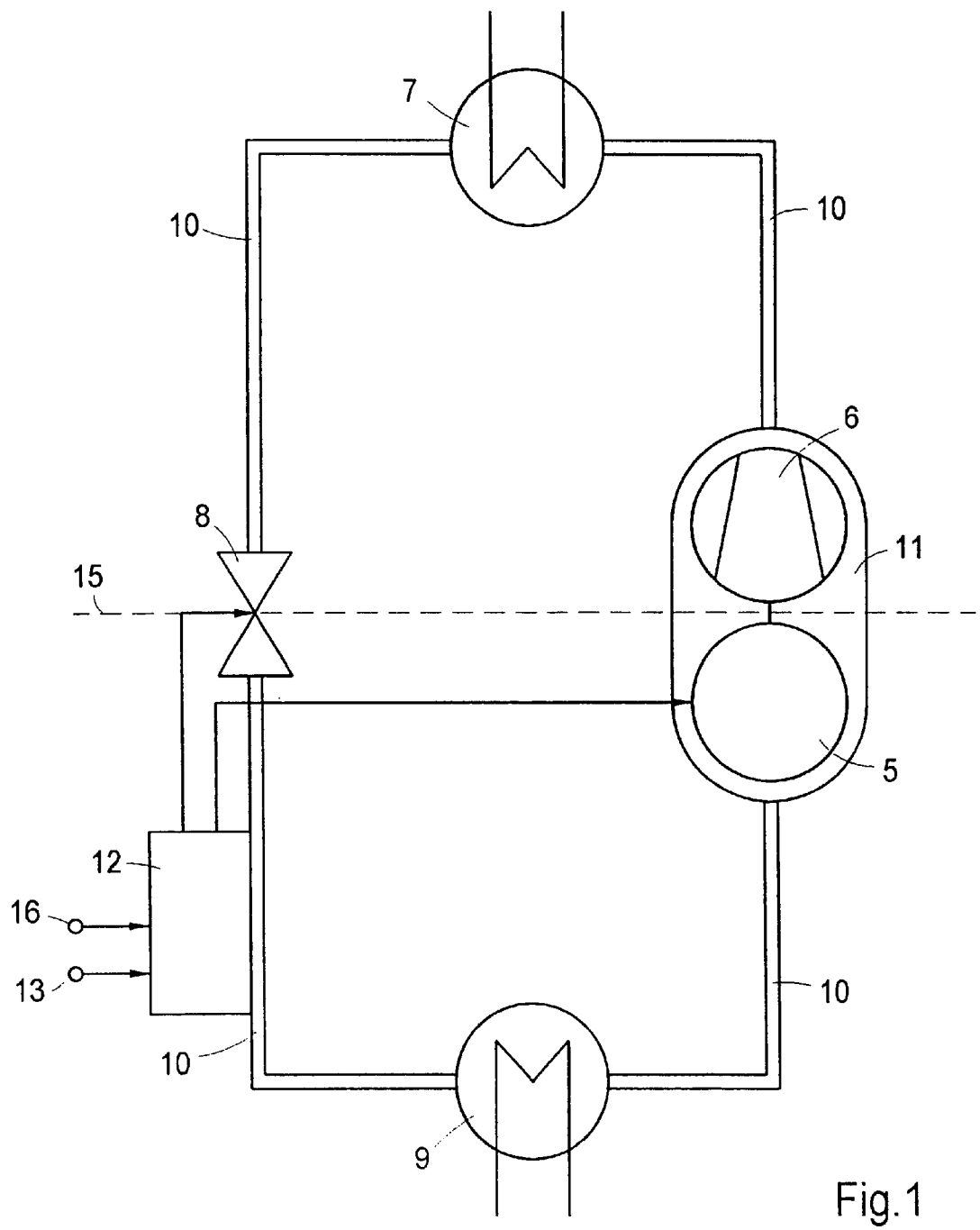
FIG. 1 shows a first exemplary embodiment.

The figures each schematically show a compression-type refrigerating system. It has a compressor 6 which is driven by an electric motor 5 and which, in particular, is a spiral compressor which is known per se. The latter has the advantage of a continuous, low-pulse conveying of the refrigerant (not illustrated in the figure). The refrigerating system furthermore has a condenser 7, an expansion valve 8 and an evaporator 9. The compressor 6, the condenser 7, the expansion valve 8 and the evaporator 9 are connected in the manner illustrated by means of refrigerant lines 10, resulting in a continuous circuit of a refrigerant from the compressor 6 via the condenser 7, the expansion valve 8 and the evaporator 9 back to the compressor 6. The dashed line 15 indicates the boundary between the high-pressure side (at the top) and the low-pressure side (at the bottom).

The function of refrigerating systems of this type is known per se and does not need to be explained in further detail for understanding the invention. It is merely pointed out that after the electric motor 5 is switched off, for example because the interior of the motor vehicle has reached a desired temperature, the pressure on the high-pressure side of the refrigerating system remains for a prolonged period.

In all of the exemplary embodiments, the electric motor 5 and the compressor 6 are located in a common housing 11, where the electric motor 5 has the refrigerant flowing around it and is therefore readily cooled. In addition, the control electronics may be cooled by the refrigerant.

In the exemplary embodiment according to FIG. 1, there is connected in a heat-conducting connection to the refrigerant line 10 in the low-pressure region a control unit 12 which is supplied with operating voltage at 13 and with a speed or power requirement at 16. As soon as the operating voltage is switched on, the controllable expansion valve 8 is opened, with the result that the difference in pressure from the compressor 6 is reduced. Directly afterwards, the electric motor 5 is switched on. After a starting time for the electric motor 5, the expansion valve 8 is then reset for the cooling mode.

Figure 2:
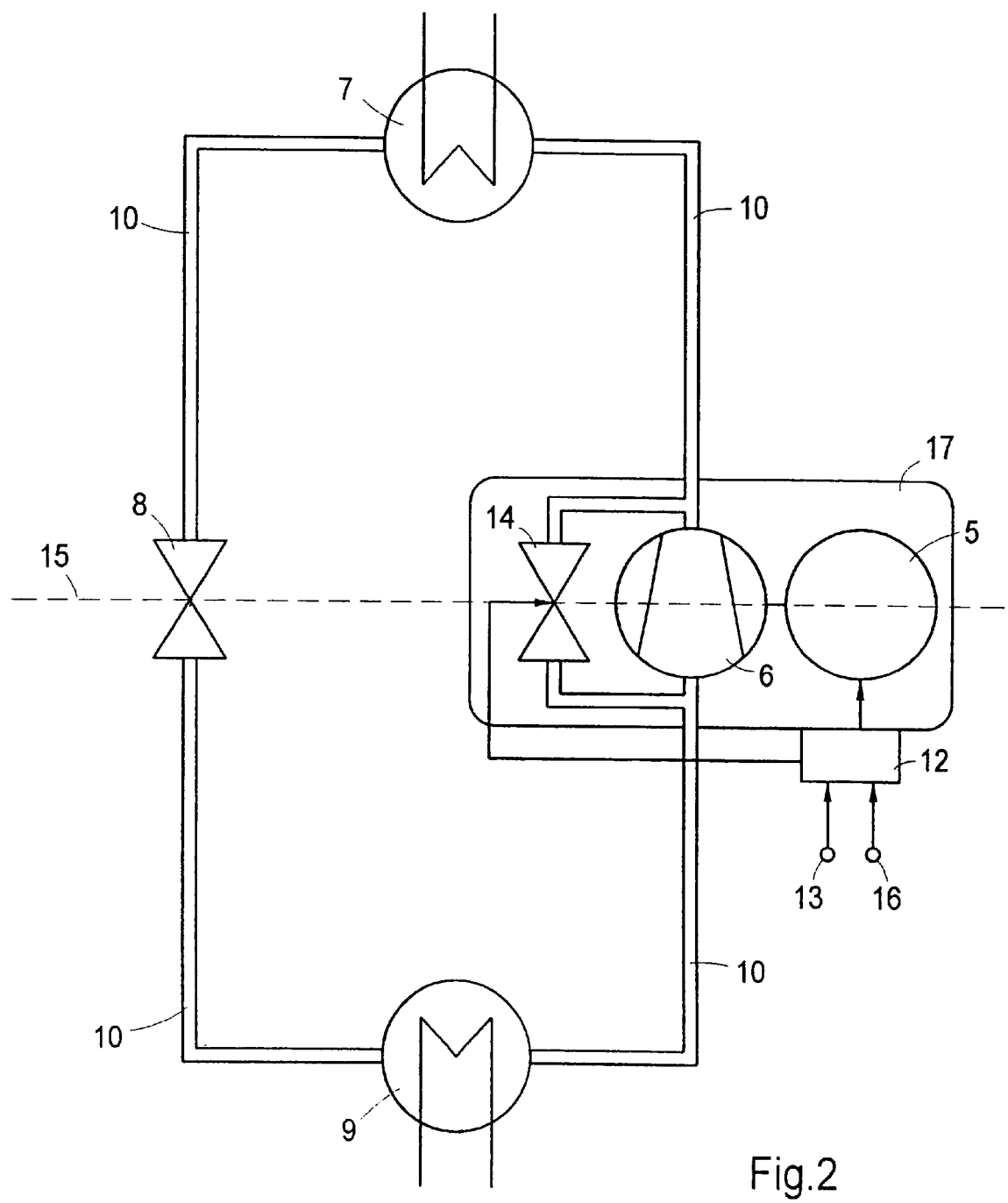
FIG. 2 shows a second exemplary embodiment.

In the exemplary embodiment according to FIG. 2, a control unit 12 is connected to the housing 17 and directs an additional valve 14 in the housing 17 into the opened state during the starting phase. After the starting phase, the valve 14 is closed, so that the refrigerating system operates as normal.

Figure 3:
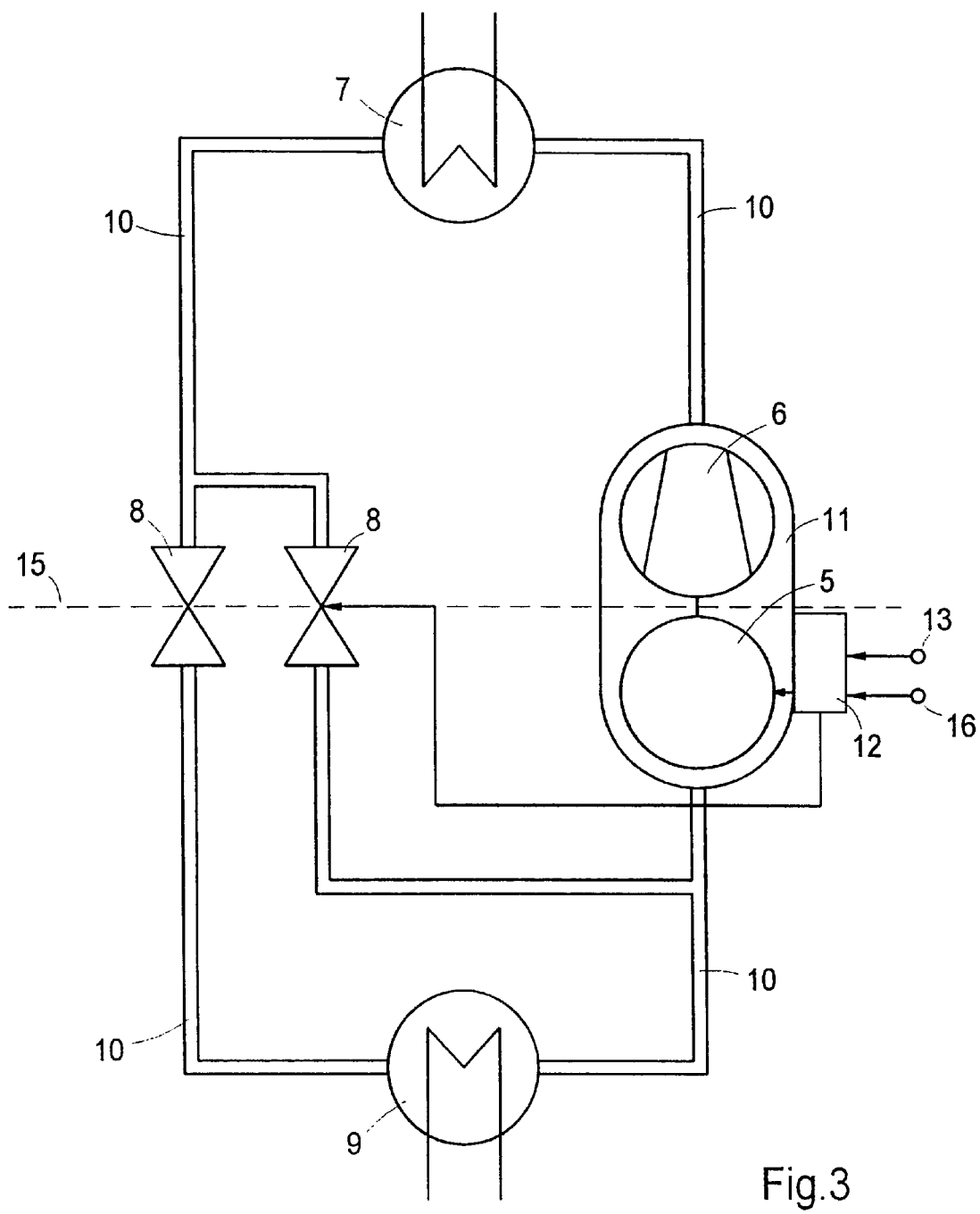
FIG. 3 shows a third exemplary embodiment.

In the exemplary embodiment according to FIG. 3, an additional expansion valve 8 controls a bypass to the system expansion valve 8 and to the evaporator 9. After the starting phase, the additional expansion valve is closed.

What is claimed is:

1. A device for driving an air conditioning compressor having an electric motor, in particular for motor vehicles, comprising controllable means (8, 14) for reducing difference in pressure between an intake side and a delivery side of the air-conditioning compressor (6) during a starting phase of the electric motor (5), said controllable means being disposed in a refrigerant circuit connecting with the compressor.

2. The device as claimed in claim 1, wherein said controllable means for reducing the difference in pressure is formed by an expansion valve (8) which is arranged in the refrigerant circuit.

3. The device as claimed in claim 1, wherein said controllable means for reducing the difference in pressure is formed by a controllable bypass (14) between the intake side and delivery side of the air-conditioning compressor (6).

4. The device as claimed in claim 3, wherein the bypass (14) is arranged within a housing (17) of the air-conditioning compressor (16).

5. The device as claimed in claim 3, wherein the bypass (14) is arranged outside a housing of the air-conditioning compressor (6).

6. The device as claimed in claim 1, wherein said controllable means for reducing the difference in pressure is formed by a speed-controlled valve which is arranged in the air-conditioning compressor.

7. The device as claimed in claim 6, wherein the speed-controlled valve is a centrifugal seal.

8. The device as claimed in claim 1, wherein the electric motor (5) is a sensorless motor having electronic commutation.

9. The device as claimed in claim 1, further comprising a control unit (12) which activates said controllable means (8, 14) for reducing the difference in pressure within a predetermined period of time after the electric motor (5) is switched on, and afterwards switches the motor off again.

10. The device as claimed in claim 1, wherein said controllable means for reducing the difference in pressure is controllable as a function of speed of the air-conditioning compressor (6).

11. The device as claimed in claim 9, wherein the control unit (12) and the electric motor (5) are in heat-conducting connection with refrigerant on the intake side.

12. The device as claimed in claim 10, further comprising a control unit for activating the controllable means, and wherein the control unit (12) and the electric motor (5) are in heat-conducting connection with refrigerant on the intake side.

13. A device for driving an air conditioning compressor having an electric motor, in particular for motor vehicles, comprising controllable means (8, 14) for reducing difference in pressure between an intake side and a delivery side of the air-conditioning compressor (6) during a starting phase of the electric motor (5), said controllable means being disposed in a refrigerant circuit connecting with the compressor wherein said controllable means for reducing the difference in pressure is formed by a first expansion valve (8) which is arranged in the refrigerant circuit, wherein said controllable means for reducing the difference in pressure is formed by a controllable, additional expansion valve (18) which is arranged in the refrigerant circuit between a high-pressure side of the first expansion valve (8) and the intake side of the air-conditioning compressor (6).

* * * * *